(No Model.) 4 Sheets—Sheet 1.
W. D. FORBES.
DIE STOCK.
No. 363,626. Patented May 24, 1887.
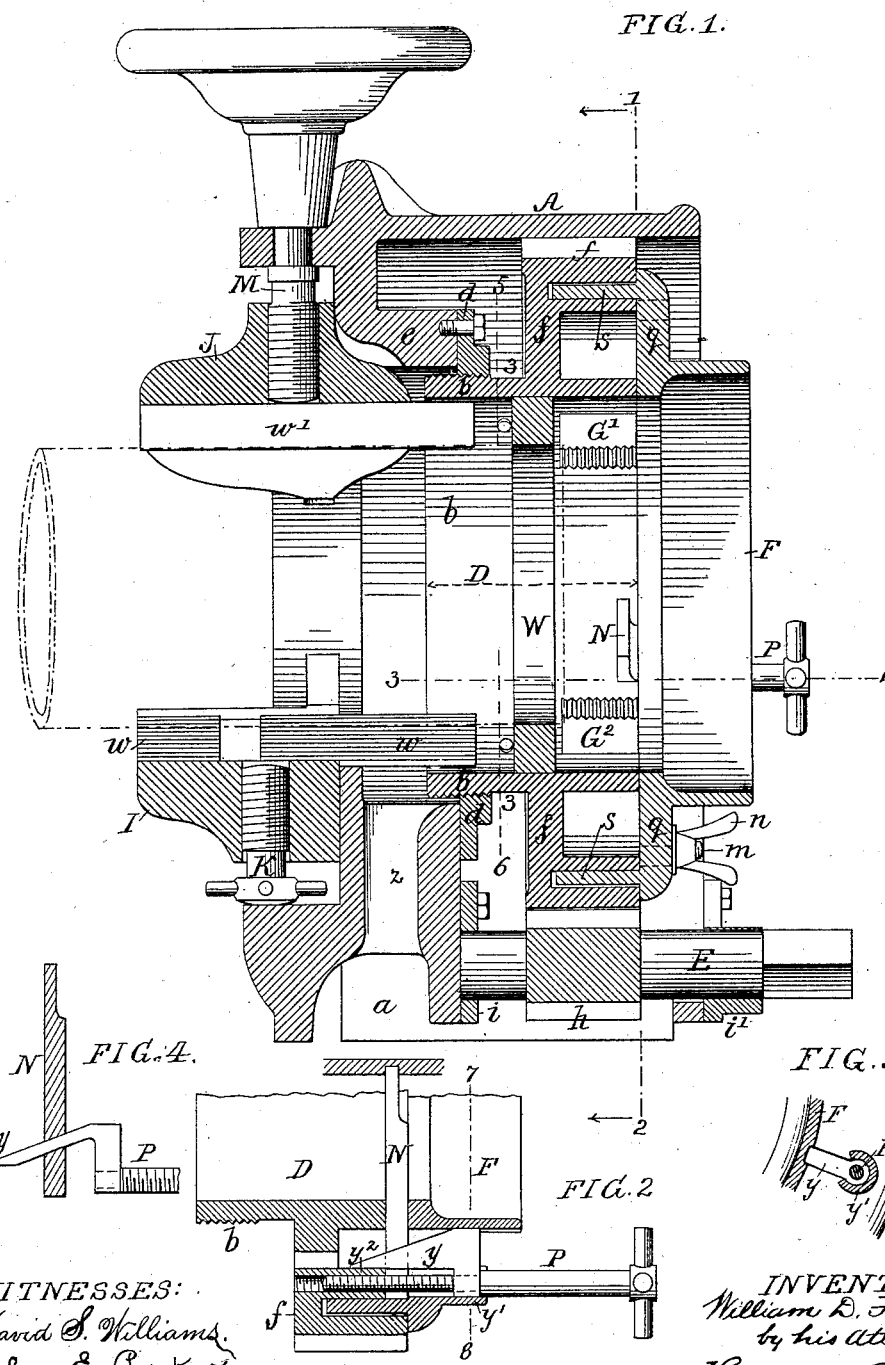
WITNESSES:
David S. Williams
John E. Parker
INVENTOR:
William D. Forbes
by his Attorneys
Howson & Sons (No Model.)  4 Sheets—Sheet 2.

W. D. FORBES.
DIE STOCK.

No. 363,626.  Patented May 24, 1887.

WITNESSES:
David S. Williams
John E. Parker

INVENTOR:
William D. Forbes
by his Attorneys
Howson & Sons (No Model.)   4 Sheets—Sheet 3.

W. D. FORBES.
DIE STOCK.

No. 363,626.   Patented May 24, 1887.

WITNESSES:
David S. Williams
John E. Parker

INVENTOR.
William D. Forbes
by his Attorneys
Howson & Sons (No Model.) 4 Sheets—Sheet 4.
W. D. FORBES.
DIE STOCK.
No. 363,626. Patented May 24, 1887.
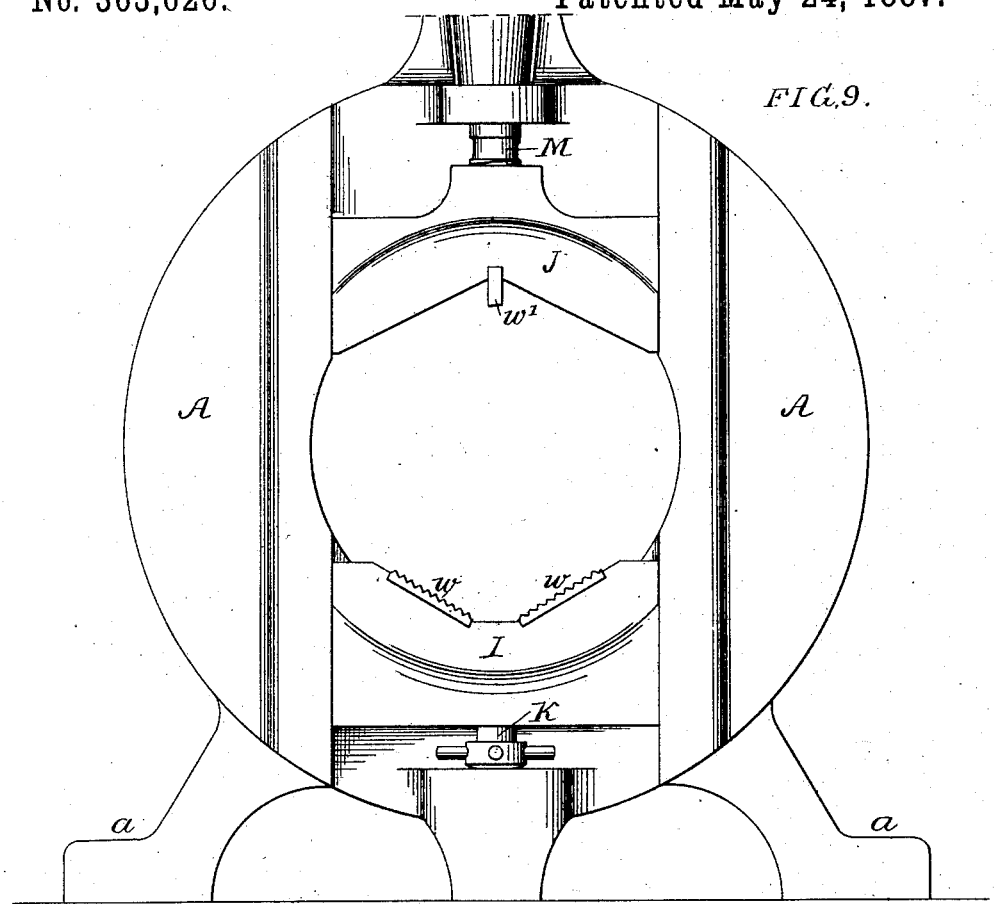
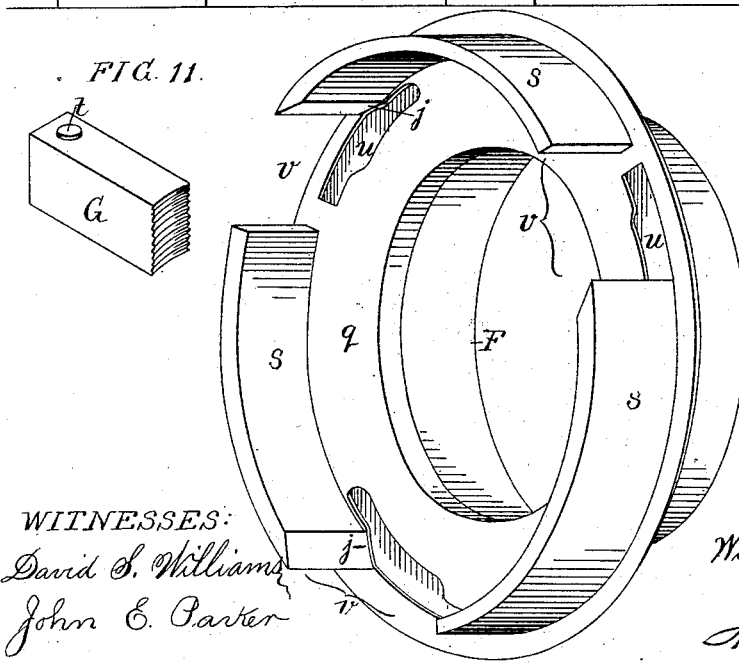
WITNESSES:
David S. Williams
John E. Parker
INVENTOR:
William D. Forbes
by his Attorneys
Howson & Sons

UNITED STATES PATENT OFFICE.

WILLIAM D. FORBES, OF BRIDGEPORT, CONNECTICUT.

DIE-STOCK.

SPECIFICATION forming part of Letters Patent No. 363,626, dated May 24, 1887.

Application filed April 18, 1884. Serial No. 128,426. (No model.)

*To all whom it may concern:*

Be it known that I, WILLIAM D. FORBES, a citizen of the United States, residing in Bridgeport, Fairfield county, Connecticut, have invented certain Improvements in Die-Stocks, of which the following is a specification.

My invention consists of certain improvements in the die-stocks for which Letters Patent No. 270,407 and No. 270,408 were granted to me January 9, 1883, my present improvements, which are fully described and claimed hereinafter, relating mainly to mechanism by which solid abutments are afforded for radial retracting-dies, to cutting-off devices by which the pipe operated on by the die-stock may be severed, to mechanism for gripping the pipe while it is operated on by the threading-dies or by the cutting-off device, to a certain construction of die-carrier, lead-screw thereon, and nut adapted to the screw, whereby the action of the threading-dies may be promptly arrested when the cutting device has to be brought into action, and to a device for feeding the cutting-off tool.

Figure 5:
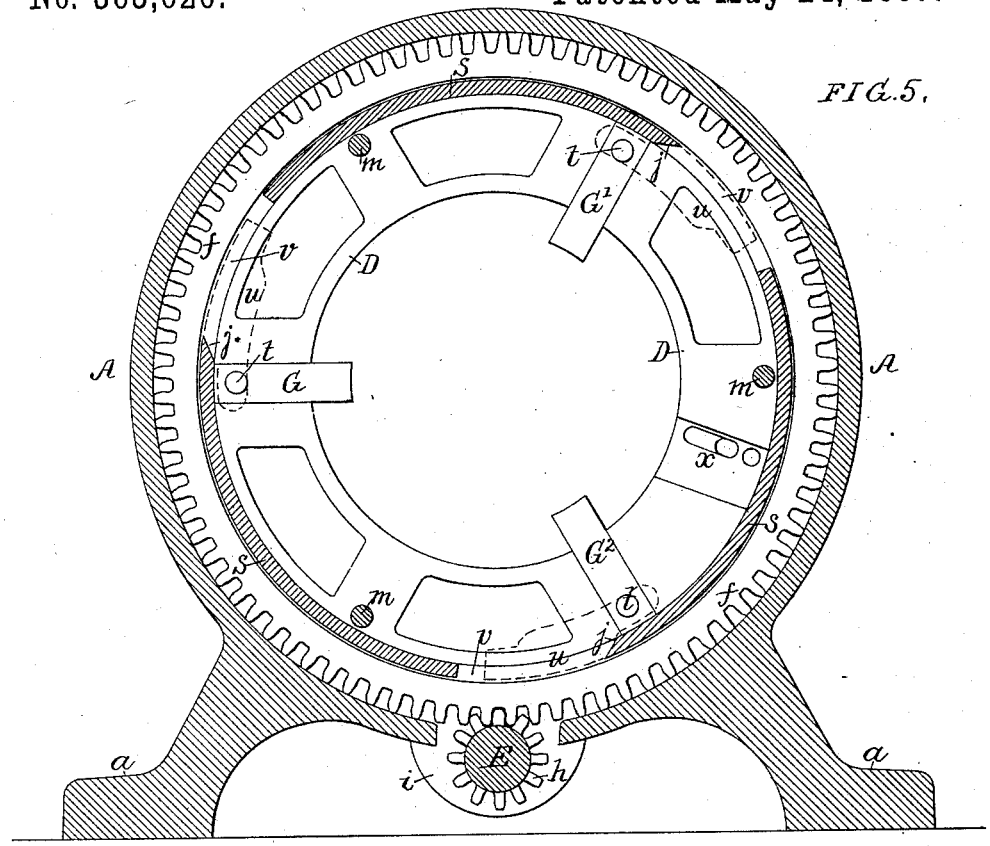
Figure 6:
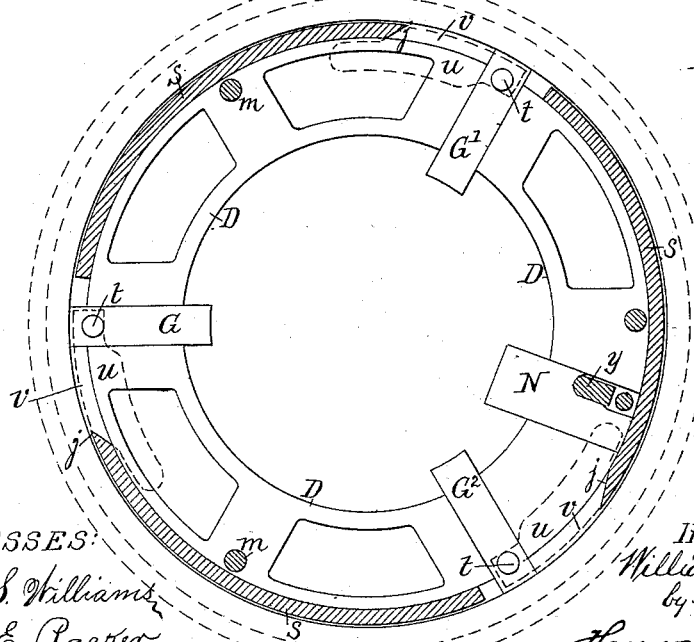
Figure 7:
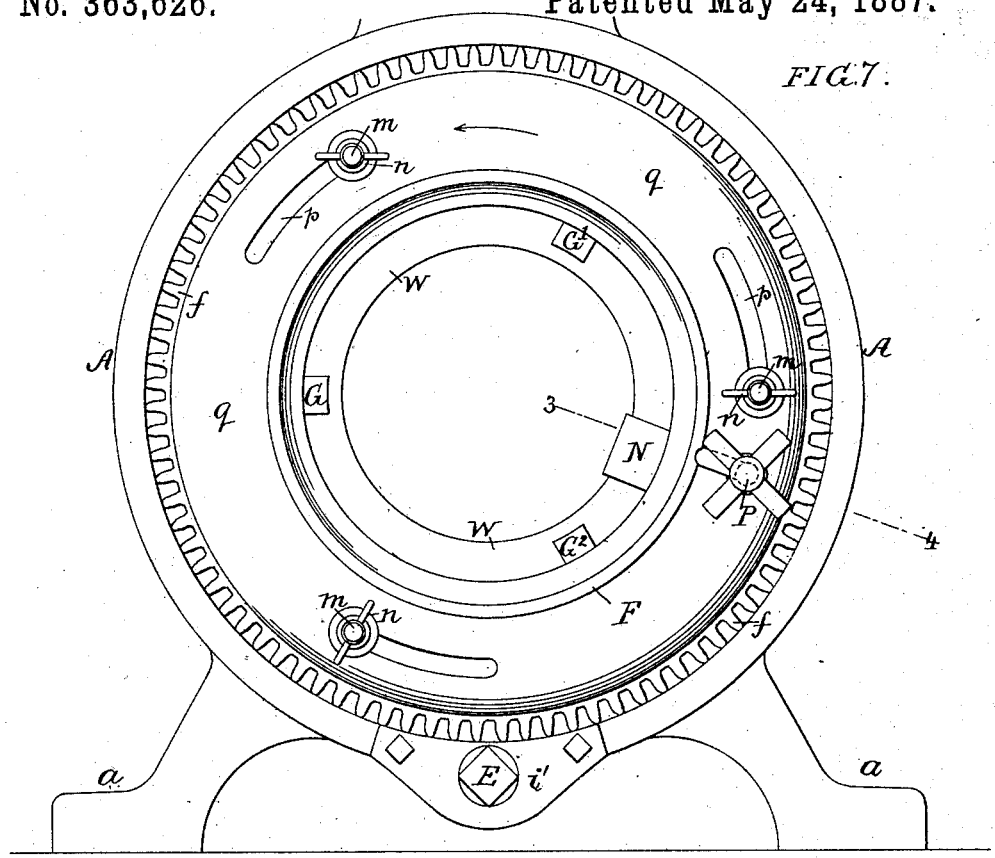
Figure 8:
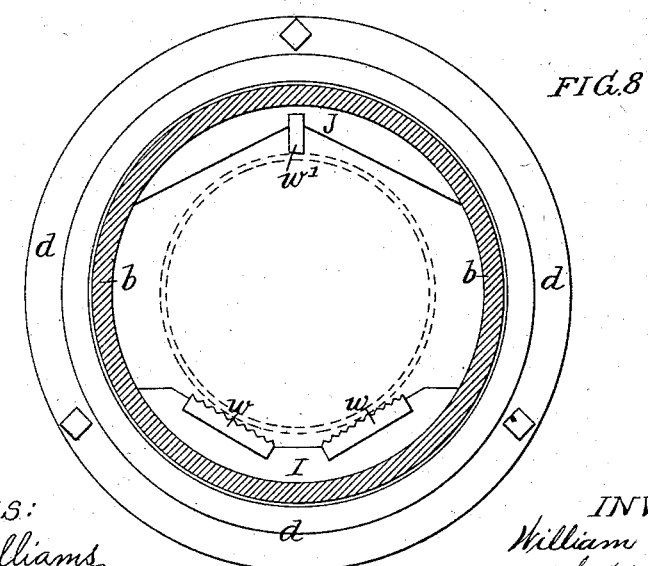

In the accompanying drawings, Figure 1, Sheet 1, is a vertical section of my improved die-stock; Fig. 2, a section of part of the mechanism, on the line 3 4, Fig. 7, illustrating the cutting-off device; Fig. 3, a section on the line 7 8, Fig. 2; Fig. 4, a modification of part of Fig. 2; Fig. 5, Sheet 2, a vertical section on the line 1 2, Fig. 1; Fig. 6, a part of Fig. 5, showing the threading-dies retracted; Fig. 7, Sheet 3, a front view of the die-stock; Fig. 8, a section on the line 5 6, Fig. 1; Fig. 9, Sheet 4, a rear view of the die-stock, showing the gripping jaws; Fig. 10, a perspective view of the annular cap, and Fig. 11 a perspective view of one of the dies.

The exterior casing, A, of the die-stock has suitable legs, $a$, and contained partly in this casing is the die-carrying ring D, the flange $b$ of which has a leading-thread adapted to the internally-threaded ring or nut $d$, secured to the internal flange, $e$, of the said exterior casing, as best observed in Fig. 1; or, instead of using the nut, the said flange $e$ may be internally threaded to receive the leading-thread of the flange $b$.

A cog-wheel, $f$, forms a part of the die-carrying ring D, this wheel fitting snugly, but so as to slide freely, within the outer casing, A, and into the teeth of this wheel gear those of a pinion, $h$, on a spindle, E, which has its bearings $i$ $i'$ in attachments on the outer casing, and is properly constructed for the reception of a suitable handle or wrench.

An annular cap, F, fits snugly against the die-carrying ring D, and is secured thereto by stud-bolts $m$, (three in the present instance,) provided with nuts $n$, the bolts passing through segmental slots $p$ in the flange $q$ of the annular cap, as shown in Fig. 7, an annular flange, $s$, on the latter projecting into an annular recess in the die carrier D.

G, G', and G² are the three threading-dies, each of which is adapted to a radial guiding-recess in the die-carrier, and each die has a pin, $t$, which projects into an irregular segmental slot, $u$, in the annular cap F, these slots being shown in dotted lines in Fig. 5, and in plain lines in the perspective view, Fig. 10, where are also shown openings $v$ in the flange $s$, for the passage of the threading-dies when the latter are retracted.

When the die-stock is in operation, the threading-dies are in contact with the said flange $s$ of the annular cap, as shown in Fig. 5, the flange thus forming a substantial abutment for the dies, to resist the outward thrust imparted to them during the operation of threading, the pins $t$ performing no part of this duty, owing to the size of the slot. By this arrangement the dies are always brought to a standard distance toward the center, thereby causing them to cut threads of perfectly equal diameters. When the dies have to be retracted, however, by turning the cap F in the direction of the arrow, Fig. 7, the cap will in the first instance be turned without moving the die; but when the comparatively abrupt shoulder $j'$, Fig. 10, on the inner edge of the irregular slots $u$, passes in contact with the pins $t$ of the dies, the latter will be retracted and the openings $v$ in the flange $s$ of the annular cap will be in a position to permit this retraction of the dies.

On referring to Figs. 1 and 8 it will be seen that there are two guided gripping-jaws, I and J, the former being provided with two serrated plates, $w$ $w$, and the latter with a bar or plate, $w'$, by and between which and the said plates $w$ $w$ the pipe to be threaded is gripped; or both of the jaws may be furnished with the serrated plates. The jaw I is made adjustable in its guides by a set-screw, K, the head of which bears on a projection on the outer casing, A, the other jaw, J, being controlled by a screw-spindle, M, arranged to turn in a projection on the casing. The main peculiarity of this part of my invention is the extension of the jaws I and J into the interior of the die-stock, so that the pipe to be threaded may be gripped near the point where the threading-dies act.

When a pipe has to be cut off, a cutting-tool, N, is passed through an opening in the die-carrier, (see Figs. 2, 6, and 7,) and is guided in the recess $x$, (shown in Fig. 5,) a wedge, $y$, controlled by a screw-spindle, P, acting on the cutter and serving to feed the same forward. The threaded portion of this screw-spindle is adapted to a threaded opening in the die-carrier, the spindle being connected to but capable of turning in a projection on the wedge, which may be made, as shown in Fig. 4, so that the wedge may serve both to feed the cutting-tool forward and to retract it. It must be borne in mind that this feed-wedge $y$ is simply fed forward or back by means of the screw P, but is supported at the point $y^2$ by the die-carrying ring and by the extension $y'$ of the annular cap F. In other words, the thrust on the cutting-tool is not resisted by the screw. Before the cutter can be put in operation, however, it is necessary that all forward feeding of the die-carrier should cease.

Instead of the device shown in my Patent No. 270,407 for arresting the forward movement of the die-carrier, I prefer the more simple and practical plan which I will proceed to describe.

On referring to Fig. 1, it will be seen that the flange $b$ of the die-carrier is not threaded throughout its entire length, a portion, 3, of the flange being plain and slightly less in diameter than the threaded portion, this plain portion being slightly longer than the threaded ring or nut $d$ is thick. Prior to putting the cutting-off device in operation, the die-carrier is fed into the stock until the thread on the flange $b$ is clear of the thread of the ring $d$—that is, till the plain portion of the flange coincides with the threaded ring, after which the die-carrier with its cutting-tool is free to be turned without being fed forward.

It should be stated that there is within the die-carrier a ring, W, through which the pipe to be threaded passes, the ring fitting snugly, but so as to turn freely in the die-carrier, and serving to center the pipe. While this ring is not often used, it is of great service when the pipe to be threaded is very thin.

There is a suitable opening in the casing A for the escape of chips.

I claim as my invention—

1. The combination, in a die-stock or threading-machine, of the die-carrier and its radially-guided dies with an annular cap, F, having a concentric flange, $s$, forming an abutment to resist the outward thrust of the dies when they are in action, substantially as set forth.

2. The combination, in a die-stock or threading-machine, of the dies with an annular cap, F, having concentric flange $s$, forming an abutment for the dies, and having openings or recesses to permit the retraction of the same, substantially as specified.

3. The combination, in a die-stock or threading-machine, of the radially-guided dies, the die-carrier having an annular recess, and a cap, F, having a flange, $s$, adapted to the annular recess in the carrier and forming an abutment to resist the outward thrust of the dies when they are in action, substantially as specified.

4. The combination, in a die stock or threading-machine, of the die-carrier and its guided cutting-tool N with a wedge, $y$, its supports $y'\ y^2$, and a screw-spindle, P, for feeding said tool, substantially as specified.

5. The combination, in a die-stock or threading-machine, of a die-carrier and its radially-guided dies, each of the latter having a pin, $t$, with the annular cap F, provided with a concentric flange, $s$, forming an abutment for the dies, and cam-slots $u$ for receiving the pins of the same, a portion of each slot being concentric with the flange $s$, and said flange having openings for permitting the retraction of the dies, substantially as set forth.

6. The combination of the outer casing of the die-stock and its threaded ring $d$ with a die-carrier having a flange, $b$, a portion of which is threaded and a portion, 3, plain.

7. The combination, in a die-stock or threading-machine, of jaws I and J, having plates $w\ w'$, extending into the interior of the stock, with mechanism for operating the said jaws, substantially as described.

In testimony whereof I have signed my name to this specification in the presence of two subscribing witnesses.

WILLIAM D. FORBES.

Witnesses:
HARRY SMITH,
HENRY HOWSON, Jr.